United States Patent
Young et al.

(10) Patent No.: US 7,047,101 B1
(45) Date of Patent: May 16, 2006

(54) REUSE IN SEMICONDUCTOR MEASUREMENT RECIPES

(75) Inventors: Scott Young, Soquel, CA (US); Dominic Gerald David, Campbell, CA (US)

(73) Assignee: KLA-Tencor Technologies Corporation, Milpitas, CA (US)

( * ) Notice: Subject to any disclaimer, the term of this patent is extended or adjusted under 35 U.S.C. 154(b) by 500 days.

(21) Appl. No.: 10/359,858

(22) Filed: Feb. 7, 2003

Related U.S. Application Data

(60) Provisional application No. 60/399,500, filed on Jul. 29, 2002.

(51) Int. Cl.
*G06F 19/00* (2006.01)
(52) U.S. Cl. ............................ 700/121; 716/4; 382/145; 702/81
(58) Field of Classification Search ................. 716/1, 716/4; 700/121, 174, 175–176; 382/144–145; 702/35, 81, 84
See application file for complete search history.

(56) References Cited

U.S. PATENT DOCUMENTS 6,298,470 B1 * 10/2001 Breiner et al. ................. 716/4
2001/0034818 A1 * 10/2001 May et al. .................. 711/151

* cited by examiner

*Primary Examiner*—Stacy A. Whitmore
(74) *Attorney, Agent, or Firm*—Luedeka, Neely & Graham, P.C.

(57) ABSTRACT

A semiconductor measurement recipe architecture organized to include reusable sub-recipes, each defining at least one parameter associated with either a semiconductor wafer and/or a semiconductor disposed thereon, is disclosed. This recipe architecture will include a set of parameter dependencies, one or more which having a respective relationship with of the sub-recipes to permit safe and reliable sub-recipe reuse. Also disclosed is a recipe generation method including: determining an appropriate baseline existing recipe that's organized to include a set of parameter dependencies and dependency related sub-recipes; perceiving a dependency change; determining which, if any, of the sub-recipes of the existing recipe remain unaffected after the dependency change(s); and generating a new recipe using at least one of the sub-recipes found to be unaffected.

12 Claims, 7 Drawing Sheets

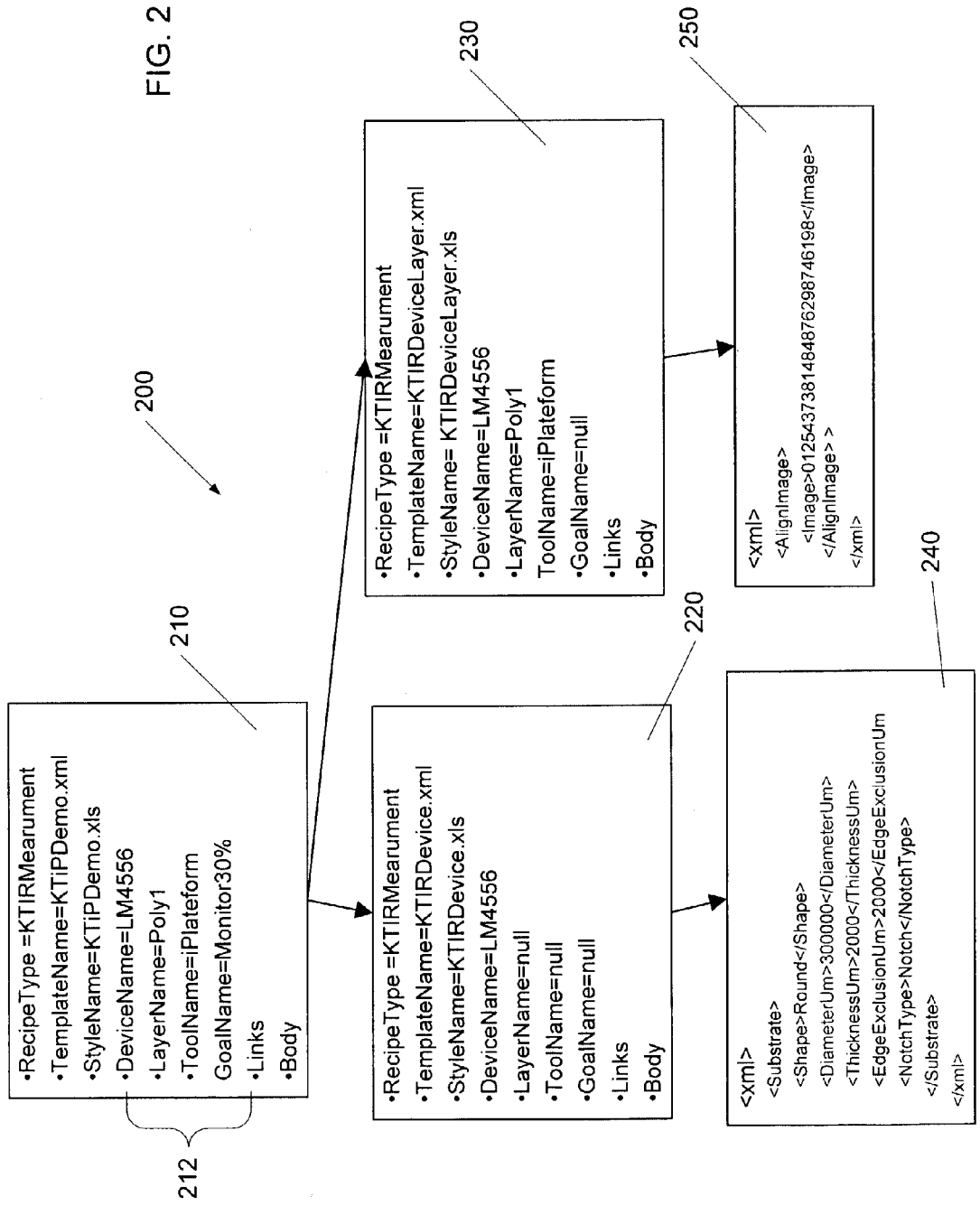

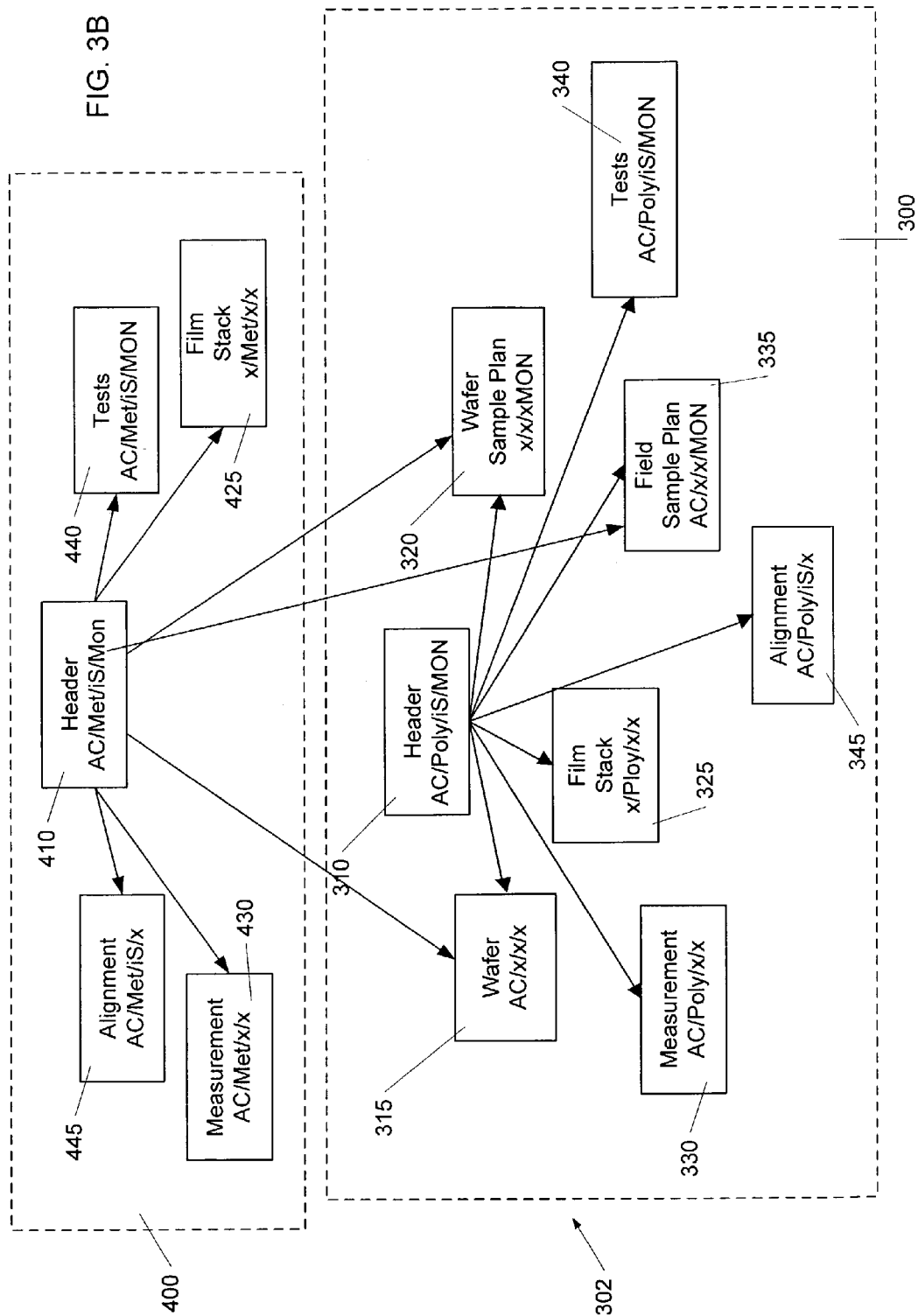

REUSE IN SEMICONDUCTOR MEASUREMENT RECIPES

RELATED APPLICATIONS

This application claims priority benefit under 35 U.S.C. § 119(e)(1) to U.S. Provisional Application No. 60/399,500 filed Jul. 29, 2002, which is incorporated herein fully by reference.

TECHNICAL FIELD

The present invention is generally directed to parameter reuse techniques, and is particularly concerned with selective reuse of one or more components of a parameter recipe for use in semiconductor measurement and verification activities involving semiconductor wafers and semiconductors disposed thereon.

BACKGROUND

Generally, the industry of semiconductor manufacturing involves highly complex techniques for integrating circuits into semiconductor materials. Due to the large number of processing steps and the decreasing size of semiconductor devices, the semiconductor manufacturing process is prone to processing defects that decrease device yields. Testing procedures to eliminate these processing defects from the processing steps are therefore critical for maintaining high yielding production facilities. Since the testing procedures are an integral and significant part of the manufacturing process, the semiconductor industry constantly seeks more sensitive and efficient testing procedures.

Automated semiconductor measurement, including testing, metrology and inspection, has proven to be an effective tool in reducing processing defects. However, as semiconductor devices increase in density and complexity, semiconductor measurement has likewise become more complex. Software automation techniques have eased the burden, but only partially so. In fact, significant resources are increasingly dedicated to merely setting up the measurement tools used to perform semiconductor measurement tasks at various steps during fabrication.

In response, a paradigm known as a semiconductor measurement "recipe" is being increasingly used by measurement setup engineers to collect all the various information a measurement tool needs to accomplish its assigned tasks. In particular, the recipe holds parameters that define what semiconductor/wafer is to be measured and how it will be measured.

At present, recipes are typically created by a setup engineer dressed in a cleanroom suit standing at an actual measurement tool with the physical wafer to be measured loaded on the tool. The setup engineer leads the tool through a setup or training process to teach and record the recipe which describes the layout of the wafer, what the process layer looks like, how to align the wafer on the stage, and what to do with the results. The setup engineer must repeat all the same training steps for the next layer wafer often collecting redundant recipe parameter information. Again for the next device, or on different tools, or with slightly different goals, the setup engineer is often forced to repeat much of the previous work again and again.

This is repetitive redundant work costly in manpower and tool costs and it allows more opportunity for human and tool errors during all the setup processes. The result is often costly, unreliable, poor performing tool recipes.

SUMMARY OF THE INVENTION

To address these and other perceived disadvantages, the present invention is directed in part to a semiconductor measurement recipe architecture organized to include a plurality of reusable sub-recipes, where each of these sub-recipes define at least one parameter associated with the measurement of a semiconductor wafer and/or a semiconductor disposed on such wafer. Further, this recipe architecture will include a set of parameter dependencies, in which each of the sub-recipes has a respective relationship to at least one dependency from this set of dependencies.

Componentization of the recipe into reusable sub-recipes will enable at least selected reuse of previously collected groupings of recipe parameters based on dependency analysis, which in turn reduces the recipe creation time and often avoids the repeated use of a physical tool and physical wafers which all reduces labor and tool usage costs.

The present invention is also directed in part to a method for generating a new semiconductor measurement recipe, which includes: 1) determining an appropriate existing recipe as a baseline from which to construct a new recipe, the existing recipe being organized to include a set of parameter dependencies and a plurality of sub-recipes relating to these dependencies; 2) perceiving a change in any of the set of dependencies; 3) determining which of the sub-recipes of the existing recipe remain unaffected by the perceived dependency change(s); and 4) generating a new recipe using at least one of the sub-recipes found to be unaffected by the perceived dependency change(s).

Use and consultation of recipe parameter dependencies proposed by this method can lead a measurement setup engineer to reuse more appropriate groups of parameters and avoid use of inappropriate recipe parameters which will may cause the recipe to fail or perform poorly. This reduces the need for setup engineer training and improves recipe reliability and tool performance over known semiconductor measurement recipe techniques.

Additional aspects and advantages of this invention will be apparent from the following detailed description of embodiments thereof, which proceeds with reference to the accompanying drawings, in which like reference designations imply like parts, features or elements.

BRIEF DESCRIPTION OF THE DRAWINGS

FIG. 2 is a more detailed block diagram of a portion of another recipe according to an embodiment of the invention.

FIGS. 3A and 3B are simplified block diagrams illustrating new recipe generation using existing sub-recipes according to an embodiment of the invention.

DETAILED DESCRIPTION OF THE EMBODIMENTS

Figure 1:
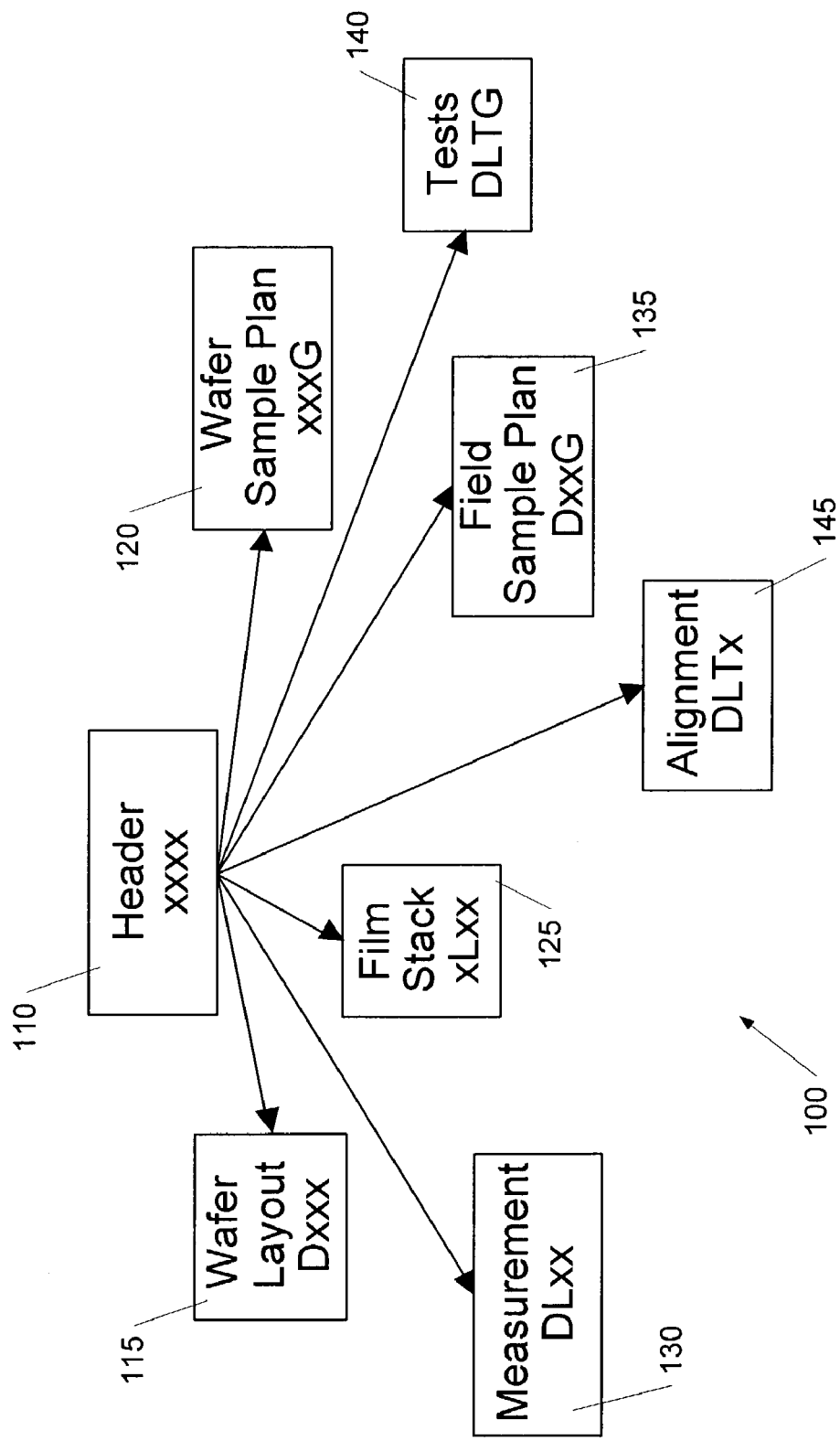
FIG. 1 is a simplified block diagram of an integrated recipe according to an embodiment of the invention.

Dependency-based sub-recipe reuse consistent with the present invention is intended to reduce the cost and improve the reliability and performance of setting up semiconductor measurement recipes. It works for all semiconductor devices to be measured, all layers of the process used to make the device, all possible measurement tools, and all goals semiconductor fabrication facilities may have in measuring these semiconductor devices in isolation or disposed within a wafer.

In accordance with a disclosed embodiment of the invention, the parameter dependencies that are believed conveniently intuitive to semiconductor measurement tool users and activities include the Device, Layer, Tool, and Goal dependencies, the set of which will be referred to DLTG. The Device dependency describes the particular semiconductor circuit or product upon which measurement is desired and how it is geographically laid out on the wafer. Though certainly not meant to be limiting in any way, example devices include all types of asics, microprocessors, memories such as DRAM, SDRAM and FLASH EEPROM, controllers, micromachines such as print heads, etc.

The Layer dependency describes a particular step in the semiconductor process used to make this product. For example, the Layer dependency for a particular recipe may be a polycrystalline etching step, trenching step, chemical mechanical polishing step, metal# etching step, etc. In put this in better context, current microprocessor fabrication may involve hundreds of different layers or steps between blank and die slicing, one or more of which may be suitable for semiconductor measurement testing using recipe parameters specific to that layer.

The Tool dependency describes the capabilities of the measurement tool using this particular recipe. As noted above, the recipe architecture and reuse teachings of the present invention are widely applicable across a range of semiconductor measurement tools, including inspectors such as wafer inspection tools, and metrology tools such as overlay and thin film measurement tools.

Likewise, the Goal dependency describes the purpose of this recipe or what the fabrication facility wants to accomplish from this recipe. Examples include "monitor", "inspect junctions", etc.

In accordance with the present embodiment, the parameters which share common dependencies are grouped together into what we shall refer to as recipe components or sub-recipes. With four basic dependencies as noted above, there are actually $2^4$ or 16 possible combinations of dependencies for any particular recipe parameter. This could be visualized as a hyper-cube matrix but let us just keep track of the dependencies of each parameter. We now can group the parameters with common dependencies.

Though other techniques may be utilized, this grouping process may be conveniently performed by observing each of the parameters constituting the recipe individually and observing which of the dependencies it implicates or affects when it varies across its legitimate range of values. Once this information is collected, parameters which implicate or affect common sets of dependencies are placed in the same sub-recipe. Redistribution of certain parameters into different sub-recipes based on best practices, experience or other knowledge-based factors, including regrouping one or more parameters into a sub-recipe which implicates all of the dependencies, may be used to further tweak the parameter groupings (note that if all dependencies are implicated, the parameter cannot be reused as described below and must instead be specified anew). Expert level assistance may be conveniently employed during e.g. parameter observation and redistribution to develop a potentially more accurate sub-recipe memberships. Note too that there may not actually be enough distinct parameters to fill all possible combinations or cells of the hyper-cube dependency matrix but we can be prepared to use them as required.

Here is an example table of groups of recipe parameters or sub-recipes with common dependencies noted.

| Sub-recipe | Device | Layer | Tool | Goal |
|---|---|---|---|---|
| Dxxx Wafer Map parameters | Y | | | |
| XxxG Wafer Sample Plan (which wafers in lot) | | | | Y |
| DxxG Field Sample Plan (which fields in wafer) | Y | | | Y |
| DLTx Wafer Alignment Images | Y | Y | Y | |
| DLxx Wafer Alignment and Measurement Target Locations | Y | Y | | |
| XLxx Film Stack parameters | | Y | | |
| DLTG Test | Y | Y | Y | Y |

This table is useful in determining which dependencies are important to which sub-recipes, as well as indicate in what situations previously created sub-recipes of an existing recipe may be safely reused when one or more of the dependencies are changed, such as during recipe editing as described in more detail below.

Turning to specific table entries as well as the representative recipe architecture shown in FIG. 1, the sub-recipe directed to Wafer Map or wafer layout sub-recipe 115 is composed of recipe parameters that are dependent only on the particular device or product undergoing measurement. In other words, when creating a new recipe from an existing recipe, changes to the Device dependant parameters will affect the Wafer Map sub-recipe, and will therefore prevent reuse of this same Wafer Map sub-recipe defined for the existing recipe in generating the new recipe. However, changes to sub-recipes dependant upon the remaining dependencies (Layer, Tool, Goal) will not affect the Wafer Map sub-recipe parameters, so if one or more of the dependencies other than the Device dependency changes, the Wafer Map sub-recipe for the existing may still be safely reused. Hence the shorthand labeling of the sub-recipe 115 in both FIG. 1 and the above table as Dxxx, with D meaning "Device dependent" and xxx meaning "n/a" or "don't care" for the Layer, Tool and Goal dependencies respectively.

The second table entry, the Wafer Sample Plan sub-recipe 120 includes the recipe parameters specifying which wafers in a lot will need measurement. As noted in the table and FIG. 1, the Wafer Sample Plan sub-recipe is dependent only on the Goal, and could be safely reused in situations where anything but the Goal dependency is changed. In particular contrast with the Wafer Map 115, the Wafer Sample Plan 120 is not affected when the device under measurement changes (e.g. from a microprocessor to a DRAM).

The third entry, the Field Sample Plan sub-recipe 135, relates to parameters specifying which fields in the particular wafer under test are undergoing measurement. The recipe parameters forming this sub-recipe are dependent on both the particular semiconductor Device undergoing measurement as well as the measurement Goal. Thus, the Field Sample Plan sub-recipe cannot be safely reused from an existing recipe if the Goal and/or Device dependency change.

The fourth entry in the table, the recipe parameters grouped to form the Wafer Alignment Images 145 sub-recipe are necessarily dependent on the particular Device, Layer and Tool contemplated for measurement, and will need to be re-created if any of these dependencies change from what is specified in the existing recipe selected for possible reuse.

Still referring to the above table and FIG. 1, the Wafer Alignment and Measurement Target Locations sub-recipe 130 is shown being dependent on both the particular Device and Layer being considered for measurement by the recipe 100. Recipe 100 parameters forming the Film Stack sub-recipe 125 are shown being dependent only on the particular Layer associated with the recipe 100. Finally, the Test sub-recipe 140 incorporating the recipe 100 parameters used to define the particular testing methodology contemplated by the recipe 100 are impacted by a change to any dependency in the set of dependencies associated with such recipe. Stated another way, the Test sub-recipe can only be reused in situations where none of the dependencies change, as in the case where sub-recipes are merely refined or corrected to cure perceived or actual errors.

As shown in the embodiment of FIG. 1, a header sub-recipe 110 links all the sub-recipes forming the recipe 100 for convenient recall and piecewise manipulation, including editing, especially where the recipe 100 coexists with other recipes in a library or similar database contained within a computer readable medium such as a memory accessible to an information processor. In particular, a networkable server may be used to store this library, including the recipe 100. As with conventional recipes, the recipe 100 may be accessed and edited from this server by client computer networked to this server. Alternatively, one or more of the sub-recipes of the recipe 100 (or even parameters forming an individual sub-recipe) may physically reside across different types and instances of media as is well-known in the art, such as one or more disks within a disk array subsystem as long as they remain logically accessible to the information processor(s) and/or logic contemplated to undertake the semiconductor measurement specified by the recipe 100. Moreover, one or more sub-recipes, or any of its constituent recipe parameters, may be stored locally on the semiconductor measurement tool or tool set contemplated by the recipe.

Figure 3A:
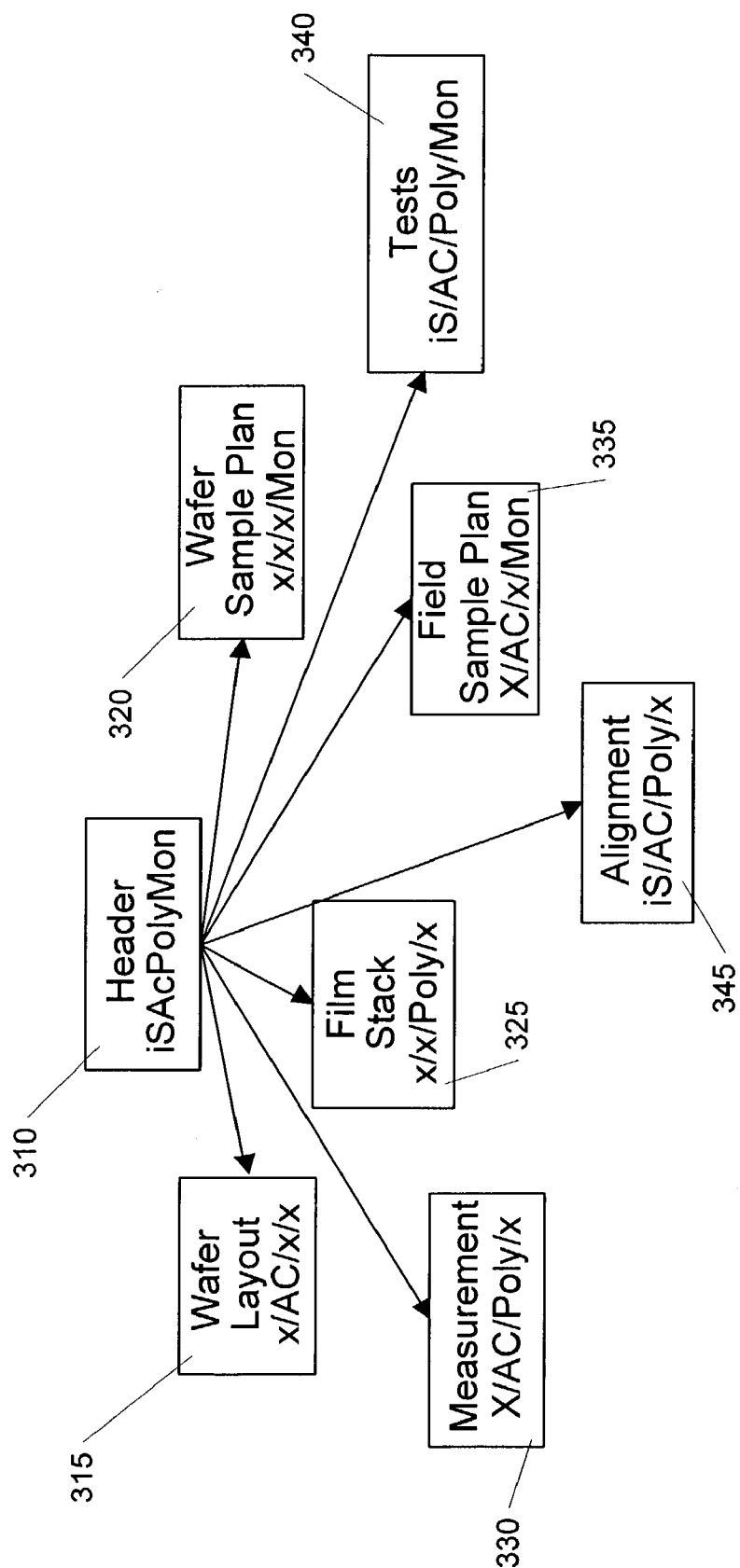

To better illustrate reuse according to this embodiment, as well as recipe storage within a recipe library consistent with this embodiment, reference is now made to FIGS. 3A and 3B. In FIG. 3A, an existing recipe 300 is shown as part of a library. The recipe 300 is arranged in accordance with the recipe format described above with reference to FIG. 1, and so includes a header 310, along with wafer map 315, wafer sample plan 320, film stack 325, measurement 330, field sample plan 335, test 340 and alignment 345 sub-recipes. In this case, however, a specific set of dependencies is recorded as part of the recipe 300, with the device dependency being "Ac" for an accessory product, the layer dependency being the "Poly" step, the tool dependency being the "iSpectra" semiconductor measurement tool available through the KLA-Tencor corporation of San Jose, Calif., and the goal dependency being "Mon" to signify the recipe 300 goal to monitor defects.

FIG. 3B similarly shows recipe 300 and its constituent sub-recipes, and additionally shows another recipe 400. Recipe 400 was generated with knowledge of recipe 300 in accordance with the sub-recipe process described herein with reference to e.g. the flowchart of FIG. 6 and thus reuses a number of recipe 300 sub-recipes, namely the wafer map 315, the wafer sample plan 320, and the field sample plan 335. This is because the set of dependencies of the recipe 400 differ from that of the recipe 300 in that only the layer dependency (Met or metal for recipe 400, Poly or polycrystalline for recipe 300) has been changed. Hence, any of the sub-recipes of the recipe 300 which do not depend on the particular Poly layer contemplated for measurement can be reused in the recipe 400. Referring to the dependency table, such sub-recipes include the wafer map 315, the field sample plan 335, and the wafer sample plan 320. As a corollary, sub-recipes which must be created anew as a result of the layer dependency change include the alignment 445, the measurement 430, film stack 425, and the test 440.

From this discussion and referencing FIGS. 3A and 3B, the benefits of reuse consistent with the present embodiment become immediately apparent. From economy and quality of design standpoints, only four new sub-recipes need be created for recipe 400. Corrections made to the "shared" sub-recipes are reflected in both recipe 300 and 400. Moreover, storage within the computer readable medium or medium allocated to the library 302 is economized since only 12 discrete sub-recipes of headers, including headers, need be accommodated. Contrast this with conventional recipe generation and management techniques, which necessarily require entry and storage of each individual parameter forming a conventional recipe, whether or not such parameters are duplicated across recipes within a library.

As mentioned above, the set of dependencies for each recipe arranged in accordance with the present embodiment will be specified as part of the recipe, so that a recipe generation or editing tool can, with knowledge of dependency relationships shown in the table above, know which groups of recipe parameters can be safely reused and which groups of recipe parameters must be created or re-created, as the case may be. This knowledge can direct a recipe creation wizard through parameters which must be created and display status of recipe completion, such as through the interfaces presented in FIGS. 4 and 5.

FIG. 2 illustrates a simplified version of a recipe 200 according to another embodiment of the invention. Here, the recipe 200 includes a header 210 including the specific DLTG dependencies 212 of interest, as well as sub-recipes 220 and 230. Other sub-recipes are omitted to simplify discussion. Here, the sub-recipe 220 includes parameters dependent only on a specific device "LM4556" contemplated for measurement by the recipe 200, and so corresponds to a wafer map sub-recipe such as sub-recipe 115 shown in FIG. 1. Representative specific parameters presented in eXensible Markup Language ("XML") format are shown in the body 240 of the sub-recipe 220. This list of parameters is by no means meant to be exhaustive, and any number of syntax options other than XML, including plural languages, may be used to express the parameters without detracting from the teachings of the present invention.

Similarly, the sub-recipe 230 is dependent on the device "LM4556", as well as the layer "Poly 1" and the tool "iPlatform" (available from the KLA-Tencor Corporation of San Jose, Calif.), but not to any specific goal. As such, the sub-recipe 230 corresponds to the alignment sub-recipe such as the sub-recipe 145 shown in FIG. 1. Again, the sub-recipe 230 links to a body 250 which contains the actual parameters in XML format (though again, only a representative parameter subset or sample is shown so as not to obfuscate the teachings of the present embodiment).

At this point, note that if recipe parameters, collections or objects with different dependency combinations must for some reason be stored in the same sub-recipe, the sub-recipe dependency must be the logical combination of the dependencies of those parameters or objects. For example if the diesizeX must be stored with the wafer sample plan sub-recipe defining which wafers in the lot are sampled, then the dependency of the sub-recipe is both Device and Goal (as opposed to FIG. 1, where the wafer sample plan 120 is dependent only on the Goal).

Further, recipe translation may be required between recipes and sub-recipes defined by different templates or formats. For example, valuable parameters may be available from a ASML tool recipe which does not use another tool's format. A translator can be defined which translates between two specific formats. Any translator can only translate parameters which have common dependencies. For example a translator may have to dissect a sub-recipe, keeping track of individual parameter dependencies before reliably inserting them into a different format. XSLT technology can be used for translation between two XML data formats as is well known in the art.

Figure 4:
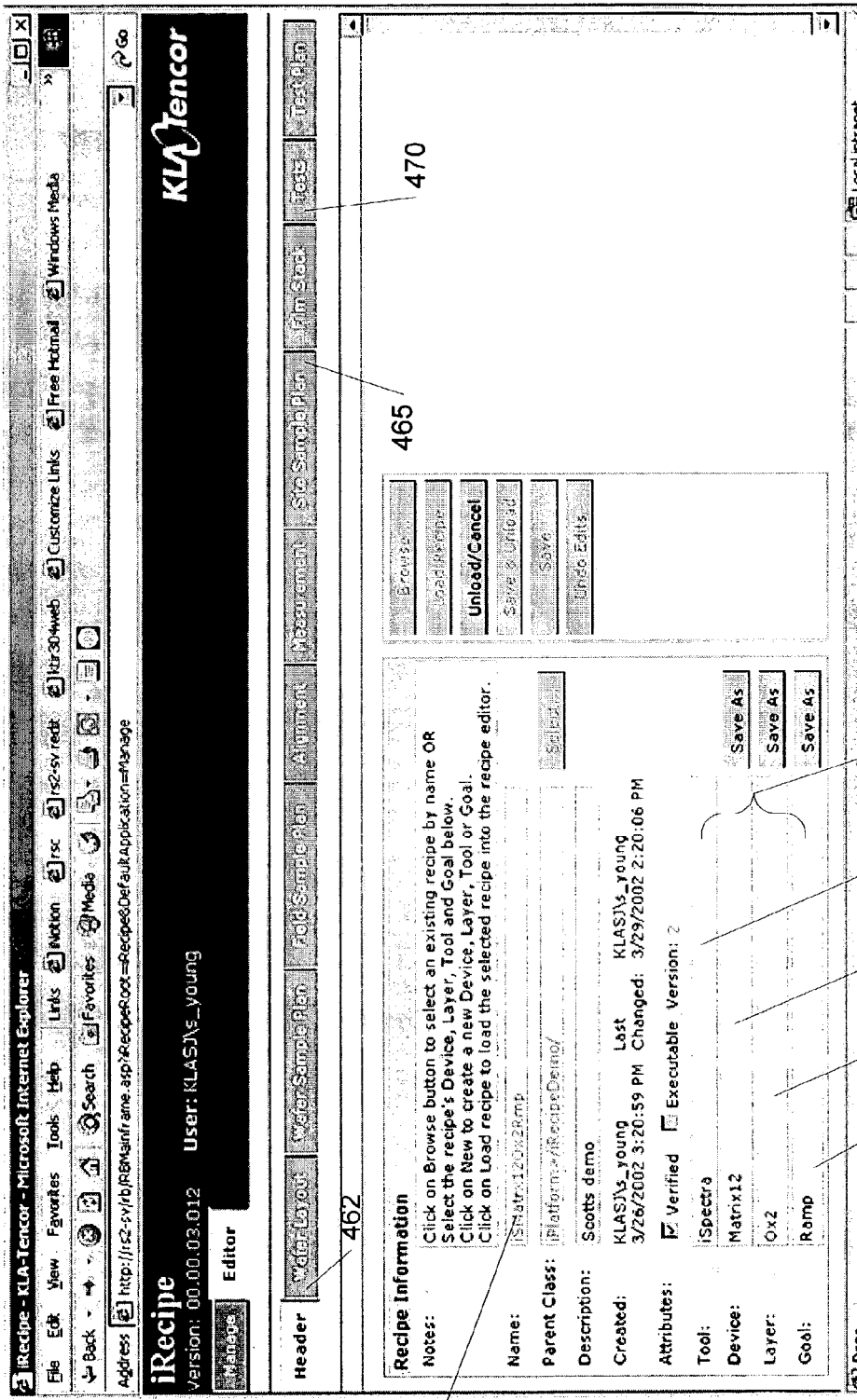
FIG. 4 illustrates an interface for existing recipe selection according to an embodiment of the invention.
Figure 5:
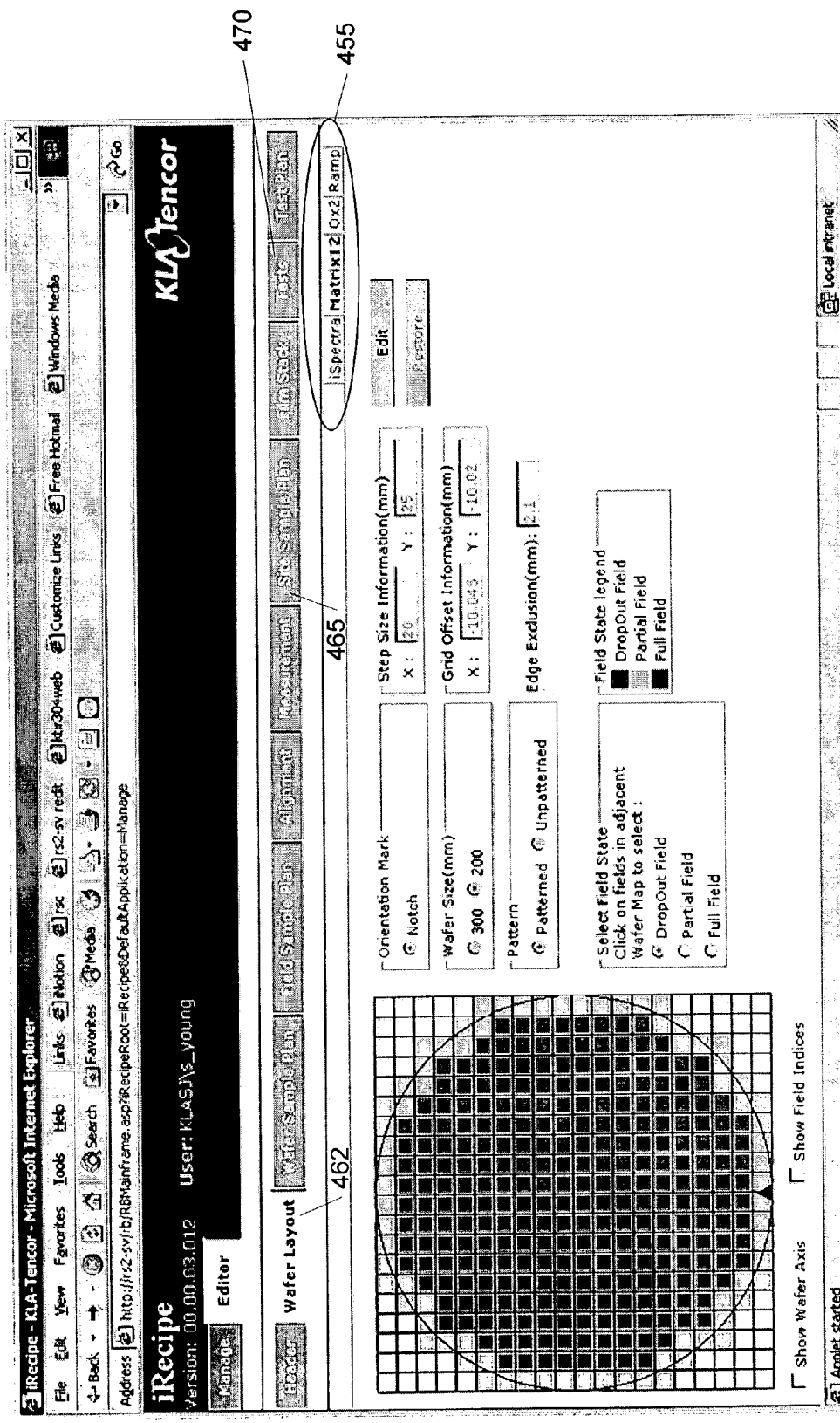
FIG. 5 illustrates an interface for modifying a sub-recipe according to an embodiment of the invention.
Figure 6:
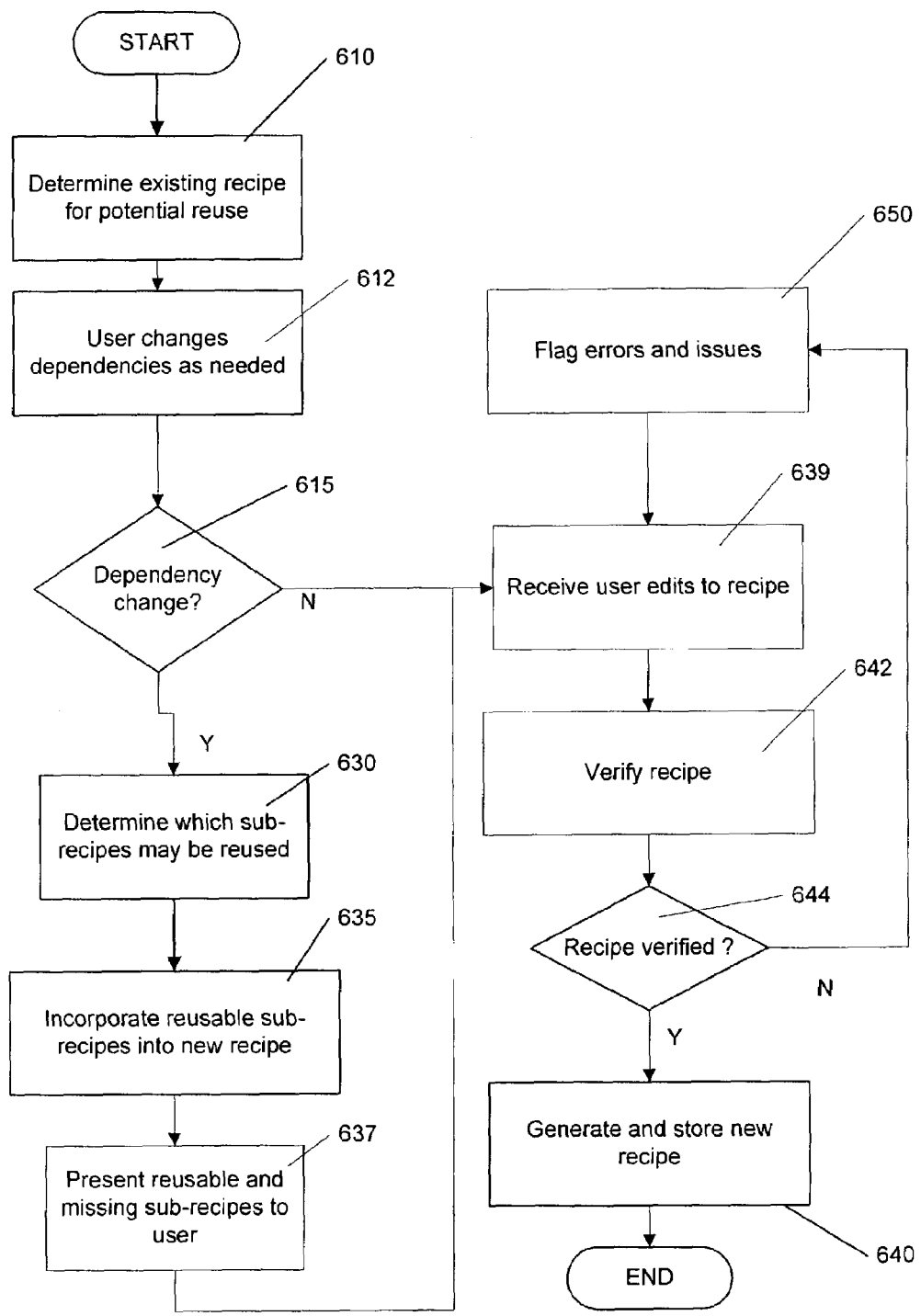
FIG. 6 is a flowchart illustrating sub-recipe reuse according to an embodiment of the invention.

FIG. 6 is a flowchart of recipe reuse and edit processing involving one or more sub-recipes of an existing recipe. Though not required, this process would be handled by an information processor having access to a recipe library such as a computer system in conjunction with new recipe creation and/or recipe editing functions, as presented by the user interfaces shown in FIGS. 4 and 5. Referring to FIG. 6, as well as FIGS. 3A and 3B described above, such reuse processing begins at step 610, in which an existing recipe in the recipe library having one or more sub-recipes suitable for reuse is determined. This may be conveniently performed through straightforward recall of the desired recipe, such as through query of the recipe name 460 as shown in FIG. 4, or through other direct retrieval process such as hierarchical file retrieval paradigms as is well-known in the art. Alternatively, if the library is organized such that a single recipe exists for a single combination of dependencies, the existing recipe of interest may be retrieved through query of it's unique dependency combination, such as through use of the fields 456, 457, 458, and 459 shown in FIG. 4. Note here that if versioning control is also used (though not considered in the interfaces of FIG. 4 or 5), even recipes with identical dependency combinations may provided in the recipe library and either collectively or individually queried, as is well-known in the art.

Once the existing recipe is determined, as indicated in step 612, the user may change one or more dependencies to the existing recipe retrieved in step 610. Control thereafter proceeds to step 615 in which a determination is made whether a change has occurred with respect to the set of dependencies specified for the existing recipe, such as through user action in step 612. This may of course occur as a result that a new recipe, while being based on the existing recipe, will probably have at least a slightly different measurement objective, and so a different combination of DLTG dependencies may be appropriate. Consider that, in the example described above with reference to FIGS. 3A and 3B, if the recipe 300 could be considered contextually as the existing recipe, the dependency change would include the transition from the Poly to Met layers to produce the recipe 400. If no change has occurred, control passes directly to step 639 in which the recipe editing process initiates. Here, it is assumed that the existing recipe is being edited rather than a new recipe (other than a new version of the existing recipe—should that feature be supported) being created. In this case, one can look at an existing recipe edit situation, such as where existing recipe sub-recipes are corrected, extended, or otherwise "globally" changed, as one where all of the sub-recipes of the existing sub-recipe are reused, subject to these corrections, extensions, or modifications. FIG. 5 illustrates a representative sub-recipe edit screen (e.g. wafer map or wafer layout 462) in which one or more parameters associated with the wafer map sub-recipe may be viewed and edited as needed.

Returning to FIG. 6, if, however, in step 615 a determination is made that one or more dependencies have changed, control instead passes to step 630.

At step 630, a determination is made as to which of the sub-recipes may be reused based on these dependency changes based on the particular dependency changes perceived in step 615 (such as through use of the above-described dependency table or similar lookup table or dependency matrix). Thereafter, at step 635 one or more of the sub-recipes, if any, deemed reusable are incorporated into the new recipe. Control thereafter passes to step 637, in which the reusable and "missing" or non-reusable sub-recipes for the new recipe are presented to the user. This may be conveniently performed using the interface shown in FIGS. 4 and 5, with the different sub-recipes accessed for review and modification through selecting sub-recipe screen tabs (e.g. tabs 462, 465, 470). Though not shown in FIG. 4 or 5, color-coding or other distinguishing visual cues may be used to distinguish reusable versus non-reusable sub-recipes in the new recipe. Control then passes to step 639.

At step 639, user edits to the new recipe such as filling in or otherwise specifying missing or non-reusable using e.g. the interface shown in FIG. 5. After editing is complete, control passes to step 642. At step 642, verification of the edited recipe and of the individual sub-recipes is performed. In this context, verification includes syntax and semantics checking, as well as determination whether the parameter values are within a legitimate range as is well-known in the art. Known XML verification and bounds checking techniques may be conveniently used if, for example, the recipe and constituent sub-recipes are presented in XML form. If the recipe is successfully verified (i.e. no errors) at step 644, then the new recipe is generated and stored (step 640), and processing terminates.

However, if in step 644, if verification reveals one or more errors which must be corrected, in isolation or in combination with one or more issues such as use of default states for one or more parameters, control instead passes to step 650, in which such errors and/or issues are flagged in a visual or other discernible manner to the user, and the editing sequence beginning at step 639 begins again. This process iterates much like conventional software compiler development until the recipe is successfully verified (step 644).

It should be noted that while in FIG. 6, only in step 640 is the new recipe stored into the recipe library, the new recipe can be stored at any time during the reuse and editing process, as long as it does not execute until satisfactorily verified.

It will be obvious to those having skill in the art that many changes may be made to the details of the above-described embodiments of this invention without departing from the underlying principles thereof. For example, in the above-described embodiments, although the recipe parameters are grouped into sub-recipes based on the 4 DLTG dependencies, the teachings of the present invention should not be construed as being so limited and in fact 2, 3, 5, or more dependency dimensions can be used such as DLTGM where M is the tool module capabilities. In such case, the number of possible combinations of dependencies or groups of recipe parameters with common dependencies=$dim^2$ in which the recipe parameters are grouped. Moreover, the particular types of sub-recipes presented above and their titling are not dispositive, as long as recipe parameters can be organized in a manner that effectuates dependency-based reuse. For example, there are many types of dependencies which may work interchangeably or alternatively to DLTG, such as Process, Product, Instrument, Purpose, etc.

The scope of the present invention should, therefore, be determined only by the following claims.

What is claimed is:

1. A method for generating a new recipe for reading a measurement on a product using a measurement tool, the method comprising the steps of:
   a. providing a collection of sub-recipes as a starting point from which to generate the new recipe, wherein the sub-recipes have functions that are based on at least one of a set of parameter dependencies, the parameter dependencies including,
      1. a device dependency including identification of the product upon which the measurement is desired and characteristics of the product,
      2. a layer dependency including identification of a material on the product and characteristics of the material,
      3. a tool dependency including identification of the measurement tool and characteristics of the measurement tool, and
      4. a goal dependency including identification of an effort that the existing recipe is to accomplish,
   b. specifying desired parameter dependencies for the new recipe,
   c. selecting some of the sub-recipes for inclusion into the new recipe, where the sub-recipes selected for inclusion have parameter dependencies that are common with the desired parameter dependencies of the new recipe,
   d. generating the new recipe from the selected sub-recipes and any new sub-recipe that is need and that was not provided in the collection of sub-recipes.

2. The method of claim 1 wherein the step of generating the new recipe further comprises the steps of:
   e. editing the new recipe, and
   f. verifying whether the new recipe is acceptable.

3. The method of claim 1 wherein the collection of sub-recipes comprises at least one existing recipe.

4. The method of claim 1 wherein the step of generating the new recipe comprises creating a header pointing to the selected sub-recipes and any new sub-recipes.

5. A series of program steps disposed on computer readable media, the program steps containing logic elements operable on a processor to generate a new recipe for directing a measurement tool to read a measurement on a product, the logic elements implementing the steps comprising:
   a. accessing a collection of sub-recipes as a starting point from which to generate the new recipe, wherein the sub-recipes have functions that are based on at least one of a set of parameter dependencies, the parameter dependencies including,
      1. a device dependency including identification of the product upon which the measurement is desired and characteristics of the product,
      2. a layer dependency including identification of a material on the product and characteristics of the material,
      3. a tool dependency including identification of the measurement tool and characteristics of the measurement tool, and
      4. a goal dependency including identification of an effort that the existing recipe is to accomplish,
   b. receiving desired parameter dependencies for the new recipe,
   c. selecting some of the sub-recipes for inclusion into the new recipe, where the sub-recipes selected for inclusion have parameter dependencies that are common with the desired parameter dependencies of the new recipe,
   d. generating the new recipe from the selected sub-recipes and any new sub-recipe that is need and that was not provided in the collection of sub-recipes.

6. The series of programming steps of claim 5 wherein the step of generating the new recipe further comprises the steps of:
   e. editing the new recipe, and
   f. verifying whether the new recipe is acceptable.

7. The series of programming steps of claim 5 wherein the collection of sub-recipes comprises at least one existing recipe.

8. The series of programming steps of claim 5 wherein the step of generating the new recipe comprises creating a header pointing to the selected sub-recipes and any new sub-recipes.

9. A computing device having a processor and a memory, the memory incorporating logic elements that enable the processor to generate a new recipe for directing a measurement tool to read a measurement on a product, the logic elements implementing in the processor the steps comprising:
   a. accessing a collection of sub-recipes as a starting point from which to generate the new recipe, wherein the sub-recipes have functions that are based on at least one of a set of parameter dependencies, the parameter dependencies including,
      1. a device dependency including identification of the product upon which the measurement is desired and characteristics of the product,
      2. a layer dependency including identification of a material on the product and characteristics of the material,
      3. a tool dependency including identification of the measurement tool and characteristics of the measurement tool, and
      4. a goal dependency including identification of an effort that the existing recipe is to accomplish,
   b. receiving desired parameter dependencies for the new recipe,
   c. selecting some of the sub-recipes for inclusion into the new recipe, where the sub-recipes selected for inclusion have parameter dependencies that are common with the desired parameter dependencies of the new recipe,
   d. generating the new recipe from the selected sub-recipes and any new sub-recipe that is need and that was not provided in the collection of sub-recipes.

10. The computing device of claim 9 wherein the step of generating the new recipe further comprises the steps of:
    e. editing the new recipe, and
    f. verifying whether the new recipe is acceptable.

11. The computing device of claim 9 wherein the collection of sub-recipes comprises at least one existing recipe.

12. The computing device of claim 9 wherein the step of generating the new recipe comprises creating a header pointing to the selected sub-recipes and any new sub-recipes.

* * * * *